US012594970B2

(12) United States Patent
Dingfelder et al.

(10) Patent No.: US 12,594,970 B2
(45) Date of Patent: Apr. 7, 2026

(54) DEVICE AND METHOD FOR CONTROLLING AN AUTOMATED DRIVING FUNCTION BASED ON A FREQUENCY OF A LIMITATION OF THE AUTOMATED DRIVING FUNCTION

(71) Applicant: Bayerische Motoren Werke Aktiengesellschaft, Munich (DE)

(72) Inventors: Benedict Dingfelder, Garching (DE); Wolfgang Hempel, Sinzing (DE); Martin Liebner, Munich (DE); Thomas Schutzmeier, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 256 days.

(21) Appl. No.: 18/034,228

(22) PCT Filed: Oct. 22, 2021

(86) PCT No.: PCT/EP2021/079367
§ 371 (c)(1),
(2) Date: Apr. 27, 2023

(87) PCT Pub. No.: WO2022/090085
PCT Pub. Date: May 5, 2022

(65) Prior Publication Data
US 2023/0382435 A1    Nov. 30, 2023

(30) Foreign Application Priority Data
Oct. 28, 2020    (DE) ..................... 10 2020 128 390.3

(51) Int. Cl.
*B60W 60/00*    (2020.01)
*B60W 40/04*    (2006.01)

(52) U.S. Cl.
CPC ........ *B60W 60/0059* (2020.02); *B60W 40/04* (2013.01); *B60W 60/0018* (2020.02); *B60W 2555/60* (2020.02)

(58) Field of Classification Search
None
See application file for complete search history.

(56) References Cited

U.S. PATENT DOCUMENTS

2014/0091917 A1    4/2014  Pink et al.
2017/0144659 A1*   5/2017  Thomas .............. G08G 1/0129
(Continued)

FOREIGN PATENT DOCUMENTS

CN    103661396 A    3/2014
CN    107428374 A    12/2017
(Continued)

OTHER PUBLICATIONS

English Translation. (Year: 2025).*
(Continued)

*Primary Examiner* — James J Lee
*Assistant Examiner* — Jonathan E Reinert
(74) *Attorney, Agent, or Firm* — Crowell & Moring LLP

(57) ABSTRACT

A device for controlling a driving function for the automated longitudinal guidance and/or lateral guidance of a vehicle is configured to determine driving situation data for different driving situations during the operation of the driving function in at least one vehicle, in which driving situations the automated longitudinal guidance and/or lateral guidance of the vehicle effected by the driving function was limited. The device is also configured to identify, based on the driving situation data for the different driving situations, a first type of driving situations for which and/or a first location at which the automated longitudinal guidance and/or lateral guidance of the vehicle effected by the driving function was
(Continued)

500 —

Ascertaining driving situation data for different driving situations — 501

Identifying a first driving situation type and/or a first location with frequent limitation of the driving function — 502

Causing the driving function to not be operable or to be operable only to a limited extent during a driving situation of the first type and/or at the first location — 503 frequently limited. Furthermore, the device is configured to cause the driving function not to be operated or to be operated only with a reduced degree of automation in a driving situation of the first type and/or at the first location.

8 Claims, 2 Drawing Sheets

(56)                References Cited

U.S. PATENT DOCUMENTS

| | | | |
|---|---|---|---|
| 2017/0261981 A1* | 9/2017 | Ichikawa | B60W 50/082 |
| 2018/0037224 A1 | 2/2018 | Bogner et al. | |
| 2019/0163176 A1 | 5/2019 | Wang et al. | |
| 2019/0220011 A1 | 7/2019 | Della Penna | |
| 2021/0001879 A1 | 1/2021 | Adiprasito et al. | |
| 2021/0094575 A1* | 4/2021 | Sato | B60W 30/16 |
| 2021/0331711 A1* | 10/2021 | Voigt | B60W 50/04 |
| 2021/0387650 A1* | 12/2021 | Li | B60W 50/14 |
| 2021/0403035 A1* | 12/2021 | Danna | B60W 60/0011 |
| 2022/0032964 A1 | 2/2022 | Unger | |

FOREIGN PATENT DOCUMENTS

| | | |
|---|---|---|
| DE | 10 2016 122 641 A1 | 5/2017 |
| DE | 10 2016 001 955 A1 | 8/2017 |
| DE | 10 2016 215 528 A1 | 2/2018 |
| DE | 10 2016 219 121 A1 | 4/2018 |
| DE | 10 2018 004 121 A1 | 11/2018 |
| DE | 10 2017 211 022 A1 | 1/2019 |
| DE | 10 2017 212 908 A1 | 1/2019 |
| DE | 10 2018 203 353 A1 | 9/2019 |
| DE | 10 2018 207 339 A1 | 11/2019 |
| DE | 10 2018 130 449 A1 | 6/2020 |

OTHER PUBLICATIONS

International Search Report (PCT/ISA/210) issued in PCT Application No. PCT/EP2021/079367 dated Feb. 8, 2022 with English translation (five (5) pages).

German-language Written Opinion (PCT/ISA/237) issued in PCT Application No. PCT/EP2021/079367 dated Feb. 8, 2022 (five (5) pages).

German-language Search Report issued in German Application No. 10 2020 128 390.3 dated Apr. 30, 2021 with partial English translation (11 pages).

Chinese-language Office Action issued in Chinese Application No. 202180070481.1 dated Jun. 6, 2025, with partial English translation (24 pages).

* cited by examiner

DEVICE AND METHOD FOR CONTROLLING AN AUTOMATED DRIVING FUNCTION BASED ON A FREQUENCY OF A LIMITATION OF THE AUTOMATED DRIVING FUNCTION

BACKGROUND AND SUMMARY OF THE INVENTION

The invention relates to a device and a corresponding method for controlling a driving function for the automated longitudinal guidance and/or lateral guidance of a vehicle.

A vehicle can have one or more driving functions that assist the driver of the vehicle in the guidance, in particular the longitudinal guidance and/or the lateral guidance, of the vehicle. One example of a driving function for assisting the longitudinal guidance of a vehicle is the adaptive cruise control (ACC) function, which can be used for example on a highway or freeway to laterally guide the vehicle at a stipulated set or target driving speed and/or at a stipulated target distance from a front vehicle driving in front of the vehicle.

The reliability of a driving function can vary during the driving operation of a vehicle, which can result in a reduced level of comfort and possibly in a reduced level of safety of the vehicle. The present document relates to the technical object of efficiently and reliably increasing the level of comfort and/or safety of a driving function, in particular a driving function for the automated lateral guidance at a signaling unit (for example at a traffic light).

The object is achieved by the claimed invention.

According to one aspect, a device for controlling a driving function for the automated longitudinal guidance and/or lateral guidance of a vehicle is described. The driving function can in particular be directed at enabling automated longitudinal guidance of a vehicle at a signaling unit (for example at a light signaling system or at a traffic light).

The device can be configured to ascertain driving situation data for different driving situations during the operation of the driving function in at least one vehicle. Here, driving situation data are provided for driving situations in which a limitation of the automated longitudinal guidance and/or lateral guidance of the vehicle effected by the driving function has occurred. In particular, the device can be configured to ascertain driving situation data for a plurality of different driving situations and/or from a plurality of different vehicles. The device can be a unit located outside the vehicle, for example a server. The unit located outside the vehicle can be configured to receive driving situation data via (wireless) communication links from one or more different vehicles.

A driving situation in which a limitation of the automated longitudinal guidance and/or lateral guidance of the vehicle effected by the driving function has occurred can be a driving situation in which the automated longitudinal guidance and/or lateral guidance of the vehicle effected by the driving function was changed through a manual intervention by a driver of the vehicle. Consequently, a manual intervention by the driver of the vehicle to change the automated longitudinal guidance and/or lateral guidance of the vehicle effected by the driving function can have taken place during the operation of the driving function. This can be an indication of a faulty or non-optimal functioning of the driving function.

Alternatively or additionally, a driving situation in which a limitation of the automated longitudinal guidance and/or lateral guidance of the vehicle effected by the driving function has occurred can be a driving situation in which the driving function was terminated by the driver of the vehicle. Alternatively or additionally, a driving situation in which a limitation of the automated longitudinal guidance and/or lateral guidance of the vehicle effected by the driving function has occurred can be a driving situation in which a transfer of the longitudinal guidance and/or lateral guidance to the driver of the vehicle was effected.

In this way, it is possible to ascertain or collect driving situation data regarding different driving situations in which it was possible to operate the driving function merely in limited fashion (or not at all). The driving situation data for a driving situation can indicate, for example, the location at which a limitation of the automated longitudinal guidance and/or lateral guidance of the vehicle effected by the driving function has occurred.

Alternatively or additionally, the driving situation data for a detected driving situation of a vehicle can comprise vicinity data in relation to the vicinity of the vehicle during the driving situation. The vicinity data can have been collected here by one or more vicinity sensors (for example by a camera, a lidar sensor, a radar sensor, an ultrasonic sensor etc.) of the vehicle. Alternatively or additionally, the driving situation data for a driving situation of the vehicle can comprise vehicle data in relation to a driving status of the vehicle (for example the driving speed, the acceleration, the steering angle, the yaw rate etc.) during the driving situation.

The device is furthermore configured to identify, on the basis of the driving situation data for the different driving situations, at least one first type of driving situations and/or at least one first location for which and/or at which a limitation of the automated longitudinal guidance and/or lateral guidance of the vehicle effected by the driving function has occurred frequently, in particular with a frequency that is equal to or greater than a predefined frequency threshold value. In this way, the driving situation data can be statistically evaluated for a plurality of different driving situations in order to identify a type of driving situation and/or a specific location during which or at which limitations or impairments of the driving function have occurred with a relatively high frequency (for example 30% or more, or 50% or more).

The location of a detected driving situation experiencing an impairment can be indicated by position data (for example by GPS coordinates). The device can be configured to identify, on the basis of the position data of the plurality of different driving situations, a location at which an impairment of the driving function is detected relatively frequently.

Alternatively or additionally, the device can be configured to allocate, on the basis of the vicinity data and/or on the basis of the vehicle data for the driving situation, a driving situation to a driving situation type from a plurality of predefined driving situation types, wherein the plurality of predefined driving situation types comprise the first driving situation type. Examples of driving situation types are: a braking maneuver, an intersection situation, a turn maneuver, an overtaking maneuver, a lane-change maneuver etc.

Consequently, one or more first locations or first driving situation types at which or during which a limitation or impairment of the driving function has occurred relatively frequently can thus be identified.

The device can furthermore be configured to cause the driving function to not be operated or to be operated only with a reduced degree of automation during a driving situation of the first type and/or at the first location.

In particular, the device can be configured to insert a map attribute for the first location in map data for a roadway network or to update it, wherein the map attribute indicates that the driving function is not operable or is operable only with a reduced degree of automation at the first location. The driving function can then evaluate the map attribute during the operation in a vehicle and cause the driving function to not be operated (for example by outputting a takeover request to the driver of the vehicle) at the first location or cause the driving function to be operated with a reduced degree of automation (for example in a manual mode) at the first location.

Alternatively or additionally, the device can be configured to effect an update of the driving function in one or more vehicles in order to cause the driving function to not be operable or to be operable only with a reduced degree of automation if a driving situation of the first type is present.

Due to the (statistical) evaluation of driving situation data for detecting a location or a driving situation type at which or during which the driving function is (relatively frequently) limited or impaired, and due to the limitation of the operation of the driving function at a detected location or during a driving situation of the detected driving situation type, the level of comfort and safety of the driving function can be increased.

The driving function can be embodied for longitudinally guiding a vehicle in an automated manner at a signaling unit (for example at a traffic light or at a stop sign) of a traffic junction (for example an intersection). In particular, automated deceleration of the vehicle at a signaling unit can be effected (for example if, based on the vicinity data of the vehicle, it is detected that the signaling device that is relevant for the driving direction of the vehicle is red). The first location at which a limitation or impairment of the driving function was detected can then be the location of a signaling unit. Then, the operation of the driving function can be prevented or restricted at the detected signaling unit. It is possible in this way to provide a particularly safe and comfortable driving function for the automated longitudinal guidance of a vehicle at a signaling unit.

The driving function for the automated longitudinal guidance of the vehicle at a signaling unit can be operable for example in an automatic mode or in a manual mode. The driving function can here be configured to take into account the signaling unit during the automated longitudinal guidance of the vehicle automatically in the automatic mode and, in the manual mode, only after confirmation by a user, in particular by the driver, of the vehicle (for example in order to effect automated deceleration of the vehicle at the signaling unit, if appropriate).

The device can be configured to cause the driving function to not be operable in the automatic mode and to be operable possibly (only) in the manual mode at the signaling unit that is arranged at the first location. In this way, particularly safe operation of the vehicle at a signaling unit can be enabled.

According to a further aspect, a vehicle guidance system for providing a driving function for the automated longitudinal guidance and/or lateral guidance of a vehicle is described. The vehicle guidance system can be configured to ascertain, during the operation of the driving function, driving situation data for one or more different driving situations during the operation of the driving function, during which a limitation of the automated longitudinal guidance and/or lateral guidance of the vehicle effected by the driving function has occurred. The vehicle guidance system is furthermore configured to provide the driving situation data outside the vehicle (for example to a unit located outside the vehicle). The driving situation data can be transmitted for this purpose to the unit located outside the vehicle via a (wireless) communication link.

According to one further aspect, a method for controlling a driving function for the automated longitudinal guidance and/or lateral guidance of a vehicle is described. The method comprises ascertaining driving situation data for different driving situations (for example for 100 or more, or 1000 or more, or 10,000 or more driving situations) during the operation of the driving function in at least one vehicle, during which a limitation of the automated longitudinal guidance and/or lateral guidance of the vehicle effected by the driving function has occurred. The method furthermore comprises identifying, on the basis of the driving situation data for the different driving situations, at least one first type of driving situations and/or at least one first location for which and/or at which a limitation of the automated longitudinal guidance and/or lateral guidance of the vehicle effected by the driving function has occurred frequently, in particular with a frequency that is equal to or greater than a frequency threshold value. The method furthermore comprises causing the driving function to not be operated or to be operated only with a reduced degree of automation during a driving situation of the first type and/or at the first location.

As already described above, the driving function described in this document can in particular be aimed at longitudinally guiding the vehicle in an automated manner at and/or in connection with a signaling unit. The driving function can be embodied here in accordance with SAE level 2. In other words, the driving function can possibly provide automated driving and/or driver assistance (with respect to the longitudinal guidance) in accordance with SAE level 2. The driving function can be limited to the longitudinal guidance of the vehicle. The lateral guidance of the vehicle during the operation can be provided manually by the driver or by a further and/or separate driving function (for example using a lane-keeping assistant).

As part of the driving function, the vehicle can be longitudinally guided in an automated manner according to a set or target speed and/or according to a target distance from a front vehicle driving (directly) in front of the vehicle. For this purpose, the driving function can provide a speed regulator through which the instantaneous driving speed of the vehicle is set, in particular regulated, in accordance with the set or target speed. Alternatively or additionally, a distance regulator can be provided, through which the instantaneous distance of the vehicle from the front vehicle is set, in particular regulated, according to the target distance. If there is no relevant front vehicle or if the front vehicle is driving faster than the set or target speed, the driving speed of the vehicle can be regulated. Alternatively or additionally, the distance of the vehicle from the front vehicle can be regulated if the front vehicle is driving more slowly than the set or target speed. The driving function can thus be configured to provide an adaptive cruise control (ACC) driver assistance function.

A vehicle can comprise a user interface for interaction with a user, in particular with the driver, of the vehicle. The user interface can comprise one or more operating elements that enable the user to stipulate the set or the target speed and/or the target distance. Alternatively or additionally, the one or more operating elements can allow the user to confirm a previously stipulated set and/or target speed and/or a previously stipulated target distance of the vehicle for the operation of the driving function. The one or more operating elements can be embodied so as to be actuated with one hand and/or with one finger belonging to the driver. Alternatively or additionally, the one or more operating elements can be arranged at a steering device (in particular at a steering wheel or at a handlebar) of the vehicle.

One example of an operating element (in particular a plus/minus operating element) is a button and/or a rocker with which the set and/or target speed or the target distance can be increased or decreased. A further example of an operating element (in particular a setting operating element) is a button with which a current vehicle speed of the vehicle can be stipulated as a set and/or target speed or with which a current distance of the vehicle from the front vehicle can be stipulated as the target distance. A further example of an operating element (in particular a resume operating element) is a button with which a set and/or target speed that was previously set and/or a target distance that was previously set can be re-confirmed or reactivated.

The user interface can furthermore comprise one or more output elements (for example a screen and/or a loudspeaker and/or a vibration element), with which outputs to the user of the vehicle can be realized.

Furthermore, the driving function can be configured to take into account one or more signaling units on the roadway (in particular road) and/or travel route along which the vehicle travels during the automated longitudinal guidance. A signaling unit can be provided to stipulate the right of way at a junction (in particular at an intersection) of the roadway network on which the vehicle travels. The stipulation of the right of way can be temporally variable (for example at a light signaling system, such as a traffic light system, with one or more different signal groups for one or more different driving directions of the vehicle at the junction) or be stipulated fixedly (such as at a traffic sign, for example a stop sign).

During the operation of the driving function, data in relation to a signaling unit that is located ahead in the driving direction of the vehicle can be ascertained. The data can comprise map data in relation to signaling units in the roadway network on which the vehicle travels. The map data can comprise in each case one or more attributes for a signaling unit. The one or more attributes for a signaling unit can indicate or comprise:

the type of signaling unit, in particular whether the signaling unit is a light signal system or a traffic sign, and/or the number of different signal groups of the signaling unit for different driving directions at the junction of the roadway network at which the signaling unit is arranged or with which the signaling unit is associated, and/or the position (for example the GPS coordinates) of the signaling unit and/or of the stop line of the signaling unit within the roadway network, and/or the relative distance of the stop line from the associated signaling unit.

The driving function can be configured to ascertain the instantaneous position (for example the current GPS coordinates) of the vehicle within the roadway network using a position sensor (for example a GPS receiver) of the vehicle and/or using odometry. Using the map data, it is then possible for a (for example the next) signaling unit along the travel route of the vehicle to be detected. Furthermore, one or more map attributes in relation to the detected signaling unit can be ascertained.

Alternatively or additionally, the data in relation to a signaling unit located ahead in the driving direction of the vehicle can comprise vicinity data in relation to the signaling unit or be ascertained on the basis of vicinity data. The vicinity data can be collected by one or more vicinity sensors of the vehicle. Examples of vicinity sensors are a camera, a radar sensor, a lidar sensor etc. The one or more vicinity data can be configured to collect sensor data (that is to say, vicinity data) in relation to the vicinity in front of the vehicle in the driving direction.

The driving function can be configured to detect, on the basis of the vicinity data (in particular on the basis of the sensor data of a camera), that a signaling unit is arranged in front of the vehicle in the driving direction. For this purpose, an image analysis algorithm can be used, for example. Furthermore, the driving function can be configured to ascertain the type of signaling unit (for example light signal system or traffic sign) on the basis of the vicinity data. The driving function can furthermore be configured to ascertain, on the basis of the vicinity data, the (signaling) status of the signaling unit in relation to permission to drive across the junction associated with the signaling unit. In particular, the colors (green, yellow or red) of the one or more signal groups of a light signal system can be ascertained.

The driving function can be configured to take into account a detected signaling unit during the automated longitudinal guidance of the vehicle. In particular, the driving function can be configured to determine, on the basis of the data in relation to the detected signaling unit, in particular on the basis of the color of a light signal, or of a signal group of the signaling unit, indicated by the data, whether or not the vehicle must stop at the signaling unit, in particular at the stop line of the signaling unit. For example, it is possible to detect that the vehicle must stop since the signal group relevant for the vehicle is red. Alternatively, it can be detected that the vehicle does not need to stop since the signal group relevant for the vehicle is green. In a further example, it is possible to detect that the vehicle must stop because the signaling unit is a stop sign.

The driving function can furthermore be configured to cause the vehicle to be stopped in an automated manner at the detected signaling unit if it is determined that the vehicle must stop at the signaling unit. For this purpose, an automated deceleration operation (up to a standstill) can be caused. In the process, the vehicle can be guided in an automated manner up to the stop line of the signaling unit or to a spot in front of the stop line of the signaling unit. During the automated deceleration operation, it is possible to control one or more wheel brakes (for example one or more friction brakes or one or more regenerative brakes) in an automated manner using the driving function in order to brake the vehicle (up to a standstill). The time profile of the deceleration that has been caused can here depend on the available braking distance up to the detected signaling unit.

Alternatively or additionally, the driving function can be configured to cause the vehicle to be longitudinally guided in an automated manner past the detected signaling unit, in particular over the stop line of the signaling unit, if it is determined that the vehicle does not need to stop at the signaling unit. In this case, the speed and/or distance regulation can be continued in accordance with the set or target speed and/or in accordance with the target distance from the front vehicle.

The driving function can thus be configured to provide an ACC driving function taking into account signaling units. The driving function in this document is also referred to as an urban cruise control (UCC) driving function.

As already described further above, the driving function can be configured to longitudinally guide the vehicle during the operation of the driving function in an automated manner in dependence on a target speed and/or in dependence on a target distance from a front vehicle driving in front of the vehicle. Furthermore, the driving function can be configured to longitudinally guide the vehicle in an automated manner past the signaling unit, in particular over the stop line of the signaling unit, in dependence on the target speed and/or in dependence on the target distance, in particular independently of the color of a light signal of the signaling unit, if a (possibly detected) signaling unit is not taken into account for the driving function. Consequently, (if a signaling unit is not taken into account) the driving function can possibly be operated as if the signaling unit (and the associated junction) did not exist.

The driving function can possibly enable the user of the vehicle to configure the driving function via the user interface (for example in a configuration menu). It is possible here to set whether the driving function should be operated in an automatic mode or in a manual mode.

In the automatic mode, the driving function can be operated such that a detected signaling unit located ahead in the driving direction is taken into account automatically during the operation of the driving function (and possibly leads to automated deceleration of the vehicle). In particular, the driving function in the automated mode can be configured to take into account a signaling unit detected on the basis of map data and/or vicinity data automatically, in particular without confirmation by the user of the vehicle, when longitudinally guiding the vehicle in an automated manner (for example in order to cause automated deceleration of the vehicle at the detected signaling unit if appropriate).

On the other hand, the driving function in the manual mode can be operated such that the detected signaling unit is taken into account for the automated longitudinal guidance of the vehicle only after the confirmation by the user of the vehicle (and possibly leads to automated deceleration of the vehicle). In particular, the driving function in the manual mode can be configured to output (via the user interface of the vehicle) a selection in relation to the taking account of the detected signaling unit to the user of the vehicle. For example, it is possible to display on the screen that a signaling unit was detected and that feedback by the user is required (to cause the signaling unit to be taken into account for the automated longitudinal guidance of the vehicle). The detected signaling unit (in particular the signaling status of the signaling unit) can then (in particular only then) be taken into account for the automated longitudinal guidance of the vehicle at the signaling unit if the selection is accepted by the user (for example by actuation of an operating element, in particular of the setting operating element). Then, automated deceleration of the vehicle at the detected signaling unit takes place, if appropriate. On the other hand, the driving function can be configured not to take into account and/or to ignore the detected signaling unit (in particular the signaling status of the signaling unit) for the automated longitudinal guidance of the vehicle at the signaling unit if the selection is not accepted by the user. In this case, the speed and/or distance regulation can be continued (without taking the signaling unit into account, in particular as if the signaling unit were not present).

By providing different (settable) modes for the operation of the driving function (in particular the UCC driving function), the level of comfort of the driving function can be increased further.

The driving function can be embodied to inform the user of the driving function about the status of the driving function by way of the user interface. In particular, the user of the driving function can be informed about whether or not a detected signaling unit located ahead in the driving direction is taken into account during the operation of the driving function, in particular during the automated longitudinal guidance of the vehicle.

The driving function can be configured to determine (for example on the basis of the map data and/or the vicinity data) whether or not a signaling unit located ahead in the driving direction is taken into account or can be taken into account during the operation of the driving function. If the signaling unit is taken into account or can be taken into account, an availability output, in particular an availability display, can be output, if appropriate, to inform the user that the signaling unit located ahead is taken into account in the automated longitudinal guidance of the vehicle (and thus automated deceleration of the vehicle at the signaling unit takes place, if appropriate).

Alternatively or additionally, (if it is determined that the signaling unit located ahead is not taken into account or cannot be taken into account for the driving function) the driving function can be configured to effect a non-availability output, in particular a non-availability indication (via the user interface), in order to inform the user of the vehicle that the signaling unit located ahead is not taken into account in the automated longitudinal guidance of the vehicle (and thus also no automated deceleration of the vehicle in dependence on the signaling status of the signaling unit is effected).

By outputting an availability and/or a non-availability output, the level of comfort and safety of the driving function can be increased further. The availability and/or non-availability outputs can here comprise in each case a visual, acoustic and/or haptic output.

The driving function can be configured to determine that the signaling status of the signal group of the signaling unit that is relevant for the driving direction of the vehicle changes (for example as the vehicle approaches the signal group or while the vehicle is stopped at the signaling group). For example, it is possible to detect a phase change from red to green.

Furthermore, the driving function can be configured to cause (in reaction to the detected phase change) information in relation to the changed signaling status of the signal group of the signaling unit to be communicated to the driver of the vehicle. For example, it is possible to effect the display of a symbol of the detected signaling unit (which may have been taken into account for the automated longitudinal guidance) via an output element (in particular on a screen) of the user interface as long as the signal group is red. After a detected phase change to green, the displayed symbol can then be taken back, if appropriate, or the output can be terminated. In this way, it is possible to reliably communicate to the driver of the vehicle that a (possibly automated) start-driving operation can be effected (for example by actuating an operating element of the user interface) for example after a standstill of the vehicle at the signaling unit.

The driving function can be configured to output a take-over request to the driver of the vehicle if the driving function is aborted. For example, it can be detected that the automated longitudinal guidance (in dependence on the set and/or target speed and/or in dependence on the target distance) cannot be continued or is not continued. The driving function can be aborted for example if the driver of the vehicle (significantly) intervenes in the longitudinal guidance of the vehicle (for example by the driver of the vehicle using the brake pedal or the accelerator pedal). Then, a takeover request (TOR) can be output to the driver of the vehicle. The longitudinal guidance must then be effected by the driver again. By outputting a takeover request, the safety of the operation of the vehicle can be increased.

According to a further aspect a (road) motor vehicle (in particular a passenger car or a truck or bus or motorcycle) is described which comprises the vehicle guidance system described in this document for operating a driving function.

According to a further aspect, a software (SW) program is described. The SW program can be configured to be executed on a processor (for example on a controller of a vehicle and/or on a unit outside the vehicle) and to thereby carry out at least one of the methods described in this document.

According to a further aspect, a storage medium is described. The storage medium can comprise an SW program which is configured to be executed on a processor and to carry out thereby at least one of the methods described in this document.

Within the scope of the document, the term "automated driving" can be understood as meaning driving with automated longitudinal or lateral guidance or autonomous driving with automated longitudinal and lateral guidance. Automated driving can be, for example, driving for a relatively long time on the freeway or temporally limited driving during parking or maneuvering. The term "automated driving" comprises automated driving with any desired degree of automation. Exemplary degrees of automation are assisted, partially automated, highly automated, or fully automated driving. These degrees of automation correspond, for example, to the definition by the BASt (Bundesanstalt für Straßenwesen—Federal Highway Research Institute) (see BASt publication "Forschung kompakt", November/2012 edition). During assisted driving, the driver carries out the longitudinal or lateral guidance permanently, while the system performs the respective other function within certain limits. During partially automated driving (TAF), the system performs the longitudinal and lateral guidance for a certain period and/or in specific situations, wherein the driver must permanently monitor the system, like during assisted driving. During highly automated driving (HAF), the system performs the longitudinal and lateral guidance for a certain period without the driver having to permanently monitor the system; however, the driver must be able to assume the vehicle guidance within a certain time. During fully automated driving (VAF), the system can automatically manage driving in all situations for a specific application; a driver is no longer required for this application. The four degrees of automation mentioned above correspond to SAE levels 1 to 4 of the standard SAE J3016 (SAE—Society of Automotive Engineering). For example, highly automated driving (HAF) corresponds to level 3 of the standard SAE J3016. SAE level 5 is also provided in SAE J3016 as the highest degree of automation but is not included in the definition by the BASt. SAE level 5 corresponds to driverless driving, in which the system can automatically manage all situations like a human driver during the entire journey; a driver is generally no longer required. The aspects described in this document relate in particular to a driving function or a driver assistance function, which is embodied in accordance with SAE level 2.

It should be noted that the methods, devices, and systems described in this document can be used both alone and in combination with other methods, devices, and systems described in this document. Furthermore, any aspects of the methods, devices and systems described in this document can be combined in a variety of ways. In particular, the features of the claims can be combined in a variety of ways.

The invention is described in more detail below with reference to exemplary embodiments.

DETAILED DESCRIPTION OF THE DRAWINGS

As is described in the introductory part, the present document relates to the increase of the reliability, the availability and/or the level of comfort of a driving function, in particular of a driver assistance system, of a vehicle, for example in connection with a signaling unit at a junction of the roadway on which the vehicle travels.

Figure 1:
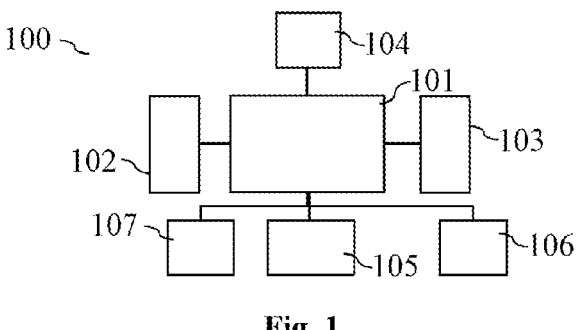
FIG. 1 shows examples of components of a vehicle.

FIG. 1 shows examples of components of a vehicle 100. The vehicle 100 comprises one or more vicinity sensors 103 (for example one or more image cameras, one or more radar sensors, one or more lidar sensors, one or more ultrasonic sensors etc.), which are configured to collect vicinity data in relation to a vicinity of the vehicle 100 (in particular in relation to the vicinity located ahead of the vehicle 100 in the driving direction). The vehicle 100 furthermore comprises one or more actuators 102, which are configured to act on the longitudinal guidance and/or the lateral guidance of the vehicle 100. Examples of actuators 102 are a braking system, a drive motor, steering etc.

The control unit 101 can be configured to provide a driving function, in particular a driver assistance function, on the basis of the sensor data of the one or more vicinity sensors 103 (i.e., on the basis of the vicinity data). For example, an obstacle along the drive trajectory of the vehicle 100 can be detected on the basis of the sensor data. The control unit 101 can then control one or more actuators 102 (for example the braking system) in order to decelerate the vehicle 100 in an automated manner and thereby avoid a collision between the vehicle 100 and the obstacle.

In particular as part of the automated longitudinal guidance of the vehicle 100, it is possible to take into account not only a front vehicle but also one or more signaling units (for example a light signal system and/or a traffic sign) along the roadway or road on which the vehicle 100 travels. In particular, the status of a light signal or traffic light system can be taken into account here, and so the vehicle 100 effects in an automated manner deceleration up to the stop line of the traffic light at a red traffic light that is relevant for its own (planned) driving direction and/or accelerates (possibly again) at a green traffic light.

Light signal systems can be constructed very heterogeneously in different countries and additionally involve different complexities with respect to the assignment of light signals to driving direction. For example, different driving directions can be regulated in combination by a first group of signals or by a signal group, and a different direction can be regulated by a different signal group. The repeating signals of a signal group can moreover be geographically located at different points at an intersection. It may therefore be difficult for a control unit 101 (also referred to as vehicle guidance system in this document) to detect on the basis of the sensor data which one or more signals of a light signal system at an intersection are relevant for the planned driving direction of the vehicle 100 and which are not (in particular if the vehicle 100 is still relatively far away from the light signal system).

Figure 2A:
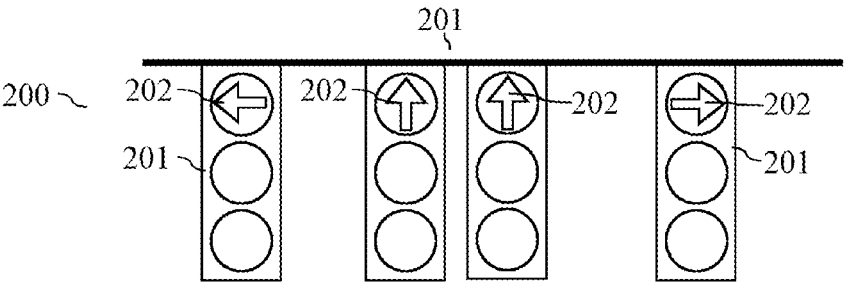
FIG. 2a shows an example of a light signal system.

FIG. 2a shows an example of a light signal system 200. The light signal system 200 illustrated in FIG. 2a has four different signal providers 201, which are arranged at different positions at an access road to an intersection. The signal provider 201 on the left has an arrow 202 toward the left and thereby indicates that this signal provider 201 applies to vehicles turning left. The two signal providers 201 in the middle have an arrow 202 pointing upward (or no arrow 202) and thereby indicate that these two signal providers 201 apply to vehicles driving straight ahead. The individual light symbols of these two signal providers 201 form signal groups. Furthermore, the signal provider 201 on the right has an arrow 202 pointing to the right and thereby indicates that this signal provider 201 applies to vehicles turning right.

The light signal system 200 illustrated in FIG. 2a is only one example of many different possible designs of a light signal system 200. A light signal system 200 can have a relatively large number of different forms of features. Examples of features are the number of signal providers 201 and/or of signal groups;

the positions of the one or more signal providers 201; and/or the assignment of a signal provider 201 to a possible driving direction over an intersection.

Figure 2B:
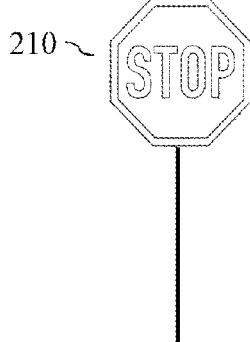
FIG. 2b shows an example of a traffic sign.

FIG. 2b shows an example of a stop sign as a traffic sign 210 which regulates the right of way at a traffic junction, in particular at an intersection. The control unit 101 of the vehicle 100 can be configured to detect, on the basis of the sensor data of the one or more vicinity sensors 103 (i.e., on the basis of the vicinity data) and/or on the basis of digital map information (i.e., of map data), a traffic sign 210 that is relevant for the right of way of the vehicle 100 on the road or roadway on which the vehicle 100 travels.

Figure 3:
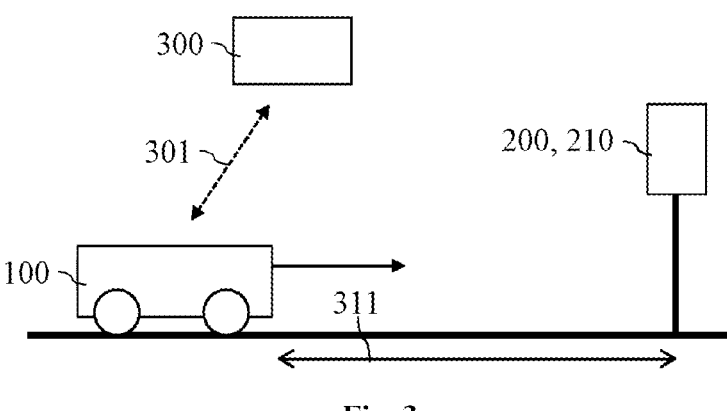
FIG. 3 shows an example of a traffic situation.

FIG. 3 shows an example of a vehicle 100 which approaches a signaling unit 200, 210 (in particular a light signal system 200 and/or a traffic sign 210) on a roadway. The one or more vicinity sensors 103 of the vehicle 100 can be configured to collect sensor data (in particular image data) in relation to the signaling unit 200, 210. The sensor data can then be analyzed (for example by way of an image analysis algorithm) to ascertain forms of one or more features of the signaling unit 200, 210. It is possible in particular to ascertain on the basis of the sensor data whether the signaling unit 200, 210 is a light signal system 200 or a traffic sign 210. It is furthermore possible to ascertain which signal provider 201 of the light signal system 200 is relevant for the (planned) driving direction of the vehicle 100. The (signaling) status of the relevant signal provider 201 (e.g., the color, such as red, yellow or green) can be furthermore ascertained.

The quality and/or the reliability with which the form of a feature of a signaling unit 200, 210 can be ascertained on the basis of the vicinity data typically depends on the distance 311 of the vehicle 100 from the signaling unit 200, 210. Furthermore, current weather conditions typically significantly affect the quality and/or the reliability of the ascertained form of a feature.

In addition, the quality and/or reliability can differ for different features.

The vehicle 100 can have a storage unit 104 on which digital map information (i.e., map data) in relation to the roadway network on which the vehicle 100 travels is stored. The map data can indicate, as attributes, forms of one or more features of one or more signaling units 200, 210 in the road or roadway network. In particular, the map data for a light signal system 200 can indicate the association between the one or more signal providers 201 or signal groups and different possible driving directions. In other words, the map data can indicate which signal provider 201 or which signal group is responsible for allowing access to which driving direction. The map data can be received in the vehicle 100, possibly by way of a communication unit 105 of the vehicle 100, via a wireless communication link (for example a WLAN or LTE communication link).

The control unit 101 of the vehicle 100 can be configured to ascertain (for example on the basis of the current position of the vehicle 100 and on the basis of a planned travel route and/or on the basis of the vicinity data of the one or more vicinity sensors 103) that the vehicle 100 approaches a signaling unit 200, 210 located ahead. The control unit 101 can furthermore ascertain the forms of one or more features of the signaling unit 200, 210 located ahead on the basis of the (stored and/or received) map data. In particular, it is possible to ascertain on the basis of the map data which signal provider 201 or which signal group of a light signal system 200 is assigned to the current or planned driving direction of the vehicle 100. In addition it is possible, on the basis of the vicinity data, to ascertain the current status of the assigned signal provider 201 or of the assigned signal group. Based on this, it is then possible to reliably and comfortably perform an automated driving function (for example an automated longitudinal guidance of the vehicle 100). In particular, by taking into account the map data, the forms of the one or more relevant features of a signaling unit 200 can already be ascertained at a relatively large distance 311 of the vehicle 100 from the signaling unit 200, which can increase the reliability, the availability, and the level of comfort of an automated driving function.

A vehicle 100 can be configured to utilize information in relation to a signaling unit 200, 210 past which the vehicle 100 drives or has driven to create and/or supplement the map data. The map data can be created and/or supplemented locally by the vehicle 100 and/or centrally by a unit 300 located outside the vehicle (for example by a backend server) (see FIG. 3). In the direct proximity of a signaling unit 200, 210, it is typically possible using the one or more vicinity sensors 103 of a vehicle 100 to collect vicinity data that precisely indicate the form of one or more features of the signaling unit 200, 210. In particular, it is precisely and reliably possible to determine on the basis of the collected vicinity data the assignments between signal providers or signal groups 201 and possible driving directions in the direct proximity.

The vehicle 100 can be configured to transmit the ascertained information (e.g., the vicinity data and/or the ascertained forms of the one or more features) to the unit 300 located outside the vehicle via a wireless communication link 301 (in connection with an identifier for the respective signaling unit 200, 210, for example in connection with the position of the signaling unit 200, 210). The unit 300 located outside the vehicle can then, on the basis of the provided information from a plurality of vehicles 100, create and/or update map data that each indicate, as attributes, the forms of one or more features for a plurality of different signaling units 200, 210. The map data can then be made available to the individual vehicles 100 in order to assist (as described above) the operation of an automated driving function.

Figure 4:
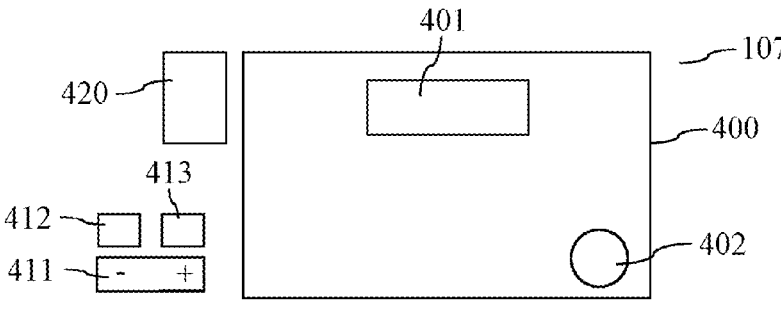
FIG. 4 shows an example of a user interface.

The vehicle 100 typically comprises a user interface 107 with one or more operating elements and/or with one or more output elements. FIG. 4 shows an example of a user interface 107 with a display unit 400, in particular with a screen, for outputting visual information. A suggestion for the automated guidance of the vehicle 100 at a signaling unit 200, 210 located ahead can be output, for example via a display element 401, on the display unit 400. Alternatively or additionally, a display element 402 can possibly be provided via which the status of the driving function (for example active or inactive) is presented.

Alternatively or additionally, the user interface 107 can comprise, as output element, at least one loudspeaker 420, via which an acoustic output (for example a warning tone) can be output to the driver of the vehicle 100.

Furthermore, the user interface 107 can comprise one or more operating elements 411, 412, 413, which enable the driver of the vehicle 100 to activate and/or parameterize the driving function. An example of an operating element is a rocker 411, which enables the driver to stipulate a set speed (i.e., a target driving speed) for the vehicle 100, in particular to increase it or decrease it. A further example of an operating element is a setting operating element 412 that enables the driver to stipulate the current driving speed as the set speed and/or to accept a suggestion for the automated guidance of the vehicle 100 at a signaling unit 200, 210 located ahead (for example in the manual mode of the driving function). Furthermore, the user interface 107 can comprise a resume operating element 413 that enables the driver for example to reactivate the driving function at a previously stipulated set speed.

The control unit 101 of the vehicle 100 can be embodied to provide automated longitudinal guidance of the vehicle 100 in urban areas. This driving function can be referred to, for example, as urban cruise control (UCC) driving function. The driving function can here be provided in an automated mode (aUCC) and/or in a manual mode (mUCC). In this case, the driver can possibly be enabled to stipulate via the user interface 107 whether the driving function is to be operated in the automatic mode or in the manual mode.

The control unit 101 of the vehicle 100 can be configured to detect a signaling unit 200, 210 located ahead along the travel route of the vehicle 100 on the basis of the vicinity data from the one or more vicinity sensors 103 and/or on the basis of the map data (in connection with the position data from the position sensor 106 of the vehicle 100). In the manual mode of the UCC driving function, a proposal or a query can be output via the user interface 107 as to whether or not the signaling unit 200, 210 is to be taken into account for the automated longitudinal guidance of the vehicle 100. The driver of the vehicle 100 can then, for example by actuating the setting operating element 412, accept or reject or ignore the suggestion. Alternatively, in the automated mode of the UCC driving function, the detected signaling unit 200, 210 can be taken into account possibly automatically (that is to say without feedback required by the driver) for the automated longitudinal guidance of the vehicle 100.

If the detected signaling unit 200, 210 is taken into account for the automated longitudinal guidance of the vehicle 100, it is possible (depending on the type and/or (signaling) status of the signaling unit 200, 210) to effect automated deceleration in order to transfer the vehicle 100 in an automated manner to a standstill (for example at a red traffic light or a stop sign). Furthermore, automatic start of the vehicle 100 can be effected (for example after a change in the (signaling) status of the signaling unit 200, 210, for example when changing to green). The vehicle 100 can then be accelerated again in an automated manner to the set speed (taking into account a stipulated minimum or target distance from a front vehicle).

It is thus possible with the UCC driving function to enable the driver of a vehicle 100 to utilize the ACC driving function even on a road with one or more signaling units 200, 210 (without the need to deactivate and reactivate the ACC function at the individual signaling units 200, 210).

The control unit 101 can be configured to determine on the basis of the vicinity data and/or on the basis of the map data whether or not a signaling unit 200, 210 located ahead can be taken into account for the automated longitudinal guidance. If it is determined that the signaling unit 200, 210 located ahead cannot be taken into account for the automated longitudinal guidance, an output (for example a visual output via a display unit 400, 402) to the driver of the vehicle 100 can be effected in order to inform the driver of the vehicle 100 that the signaling unit 200, 210 located ahead cannot be taken into account for the automated longitudinal guidance. This display can be referred to as "non-availability indication." It is then the task of the driver of the vehicle 100 if appropriate to decelerate the vehicle 100 before the signaling unit 200, 210 (for example because the traffic light switches to red or because the signaling unit 200, 210 is a stop sign).

The control unit 101 can furthermore be configured to detect, during the operation of the UCC driving function, that the vehicle 100 cannot (or can no longer) be longitudinally guided in an automated manner (for example because a manual intervention by the driver in the longitudinal guidance of the vehicle 100 has taken place). In this case, a takeover request (TOR) can be output to the driver of the vehicle 100 in order to cause the driver to manually take over the longitudinal guidance of the vehicle 100.

During the operation of a driving function for the automated longitudinal guidance and/or lateral guidance of the vehicle 100, one or more manual interventions by the driver of the vehicle 100 may occur. In particular, it can be detected that the driving function is oversteered and/or aborted by the driver of the vehicle 100 (and the driver possibly takes over the manual guidance of the vehicle 100).

The control unit 101 of the vehicle 100 can be configured to collect, during the operation of the driving function, driving situation data in relation to one or more situations in which the driving function has experienced a reduced degree of automation. In particular, driving situation data can be collected in relation to a situation in which the driving function is aborted by the driver;

the driving function outputs a takeover request for the driver; and/or a manual intervention by the driver takes place on account of which the automated guidance of the vehicle 100 is changed.

The control unit 101 can furthermore be configured to ascertain position data in relation to the position of the respective situation. In particular, it is possible (on the basis of the position data from the position sensor 106 of the vehicle 100) to ascertain, for any situation in which the driving function experiences a limitation of the automation, position data in relation to the position at which the respective situation has occurred.

The driving situation data can consequently comprise data, in particular diagnostics data, in relation to one or more driving situations in which the driving function has a reduced degree of automation; and position data in relation to the position of the respective driving situation.

The driving situation data can be made available to a unit 300 located outside the vehicle. The unit 300 located outside the vehicle can be configured to analyze the driving situation data from a plurality of vehicles 100 and/or from a plurality of journeys. It is thus possible to evaluate a plurality of different datasets with driving situation data. It is possible to ascertain during the evaluation whether there is one location and/or one driving situation at which or for which there is a statistical frequency of a reduction in the degree of automation. For example, a signaling unit 200, 210 can be detected at which the degree of automation of the UCC driving function had to be reduced relatively frequently.

The unit 300 located outside the vehicle can be configured to update map data in relation to the roadway network on which the vehicle 100 travels on the basis of the statistical evaluation of the plurality of datasets with driving situation data. The map data can indicate for example one or more roadway sections in the roadway network in which operation of the driving function is possible and indicate one or more roadway sections in which operation of the driving function is not possible or only limited operation of the driving function is possible. The roadway sections can be adapted on the basis of the evaluation of the plurality of datasets with driving situation data.

The map data can have in each case one map attribute, for example for signaling units 200, 210 of the roadway network, that indicates whether or not the UCC driving function can be operated at the respective signaling unit 200, 210; and/or whether the UCC driving function at the respective signaling unit 200, 210 can be operated in the automatic mode or in the manual mode.

The abovementioned map attribute for the specific signaling unit 200, 210 can be ascertained and/or updated based on the evaluation of a plurality of datasets with driving situation data in relation to the operation of the UCC driving function at a specific signaling unit 200, 210.

Alternatively or additionally, the driving function, in particular the mode of function of the driving function, can be adapted on the basis of the evaluation of a plurality of datasets with driving situation data in relation to the operation of a driving function, in particular to ensure that it is possible to prevent at least some of the situations with a reduced degree of automation of the driving function after a change of the mode of function of the driving function.

Thus, errors pertaining to a driving function, in particular an assistance function, can be detected. Here, evaluation of metrics (i.e., of driving situation data) of the driver assistance function can take place, which are aggregated in a unit 300 located outside the vehicle in order to identify in this way one or more situations with a high error probability of the driving function.

In particular, detection and collection of drops and user interventions during the operation of a driving function, for example of a lane-keeping assistant, can take place. The operational data can be evaluated by a unit 300 located outside the vehicle in order to identify driving situations and/or locations at which corresponding limitations of the driving function occur with a significant frequency. It is then possible to effect a block of a detected location or a detected driving situation for the driving function, if appropriate. This can be accomplished for example by stipulating a map attribute in map data and/or by transmitting a message from the unit 300 located outside the vehicle to the vehicle 100. Alternatively or additionally, the detected driving situations and/or locations can be evaluated in order to identify and take measures that address the incorrect behavior of the driving function in and/or at the one or more detected driving situations and/or locations.

Figure 5:
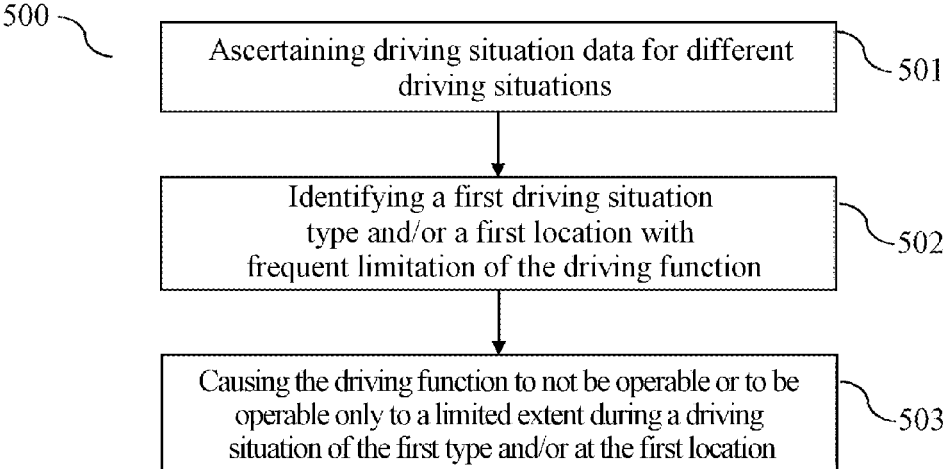
FIG. 5 shows a flowchart of an example of a method for operating a driving function in specific driving situations.

FIG. 5 shows a flowchart of a (possibly computer-implemented) method 500 for controlling a driving function for the automated longitudinal guidance and/or lateral guidance of a vehicle 100. The method 500 can be carried out by a unit 300 located outside the vehicle. Control of the driving function in various vehicles 100 can be effected by the provision of map data (with one or more map attributes through which the operation of the driving function is controlled) and/or by transmitting control messages to the individual vehicles 100 and/or by adapting the mode of function of the driving function.

The method 500 comprises ascertaining 501 driving situation data for different driving situations during the operation of the driving function in at least one vehicle 100, during which a limitation of the automated longitudinal guidance and/or lateral guidance of the vehicle 100 effected by the driving function has occurred. Typically, driving situation data are ascertained by a plurality of vehicles 100 during a plurality of journeys. The driving situation data can be provided by the different vehicles 100 in each case via a communication link 301.

The method 500 furthermore comprises identifying 502, on the basis of the driving situation data for the different driving situations, at least one first type of driving situations and/or at least one first location for which and/or at which a limitation of the automated longitudinal guidance and/or lateral guidance of the vehicle effected by the driving function has occurred frequently, in particular at a frequency that is equal to or greater than a frequency threshold value. In this way, a first driving situation type and/or a first location for which or at which the driving function could not be operated without limitation relatively frequently (for example with a frequency of 30% or more) can be identified.

The method 500 furthermore comprises causing 503 the driving function to not be operated or to be operated only with a reduced degree of automation during a driving situation of the first type and/or at the first location. For example, a map attribute can be incorporated in the map data for the first location, which attribute indicates that the driving function is not operable or is operable only with a reduced degree of automation at the first location.

With the measures described in this document, a particularly reliable, safe and comfortable operation of a driving function can be made possible.

The present invention is not limited to the exemplary embodiments shown. In particular, it should be noted that the description and the figures are meant to merely illustrate the principle of the proposed methods, devices and systems.

The invention claimed is:

1. A device for controlling a driving function for automated longitudinal guidance and/or lateral guidance of a vehicle, the device comprising:

a processor, wherein the device is configured:

to ascertain driving situation data for different driving situations during operation of the driving function in a vehicle for which a limitation of the automated longitudinal guidance and/or lateral guidance of the vehicle effected by the driving function has occurred, to identify, based on the driving situation data for the different driving situations, a first type of driving situations and a first location for and at which the limitation of the automated longitudinal guidance and/or lateral guidance of the vehicle effected by the driving function has occurred with a frequency that is equal to or greater than a frequency threshold value, to insert or update a map attribute for the first location in map data for a roadway network, wherein the map attribute indicates that the driving function is not operable or is operable only with the reduced degree of automation at the first location, and to cause the driving function to not be operated by outputting a takeover request to a driver of the vehicle, or to be operated only with a reduced degree of automation by the driver of the vehicle in a manual mode, during a driving situation of the first type at the first location.

2. The device according to claim 1, wherein the driving situation data for the driving situation indicate a location at which the limitation of the automated longitudinal guidance and/or lateral guidance of the vehicle effected by the driving function has occurred.

3. The device according to claim 1, wherein the driving situation data comprise:

vicinity data in relation to a vicinity of the vehicle during the driving situation, wherein the vicinity data have been collected by one or more vicinity sensors of the vehicle; and/or vehicle data in relation to a driving status of the vehicle during the driving situation.

4. The device according to claim 3, wherein:

the device is further configured to allocate the driving situation to a type from a plurality of predefined driving situation types based on the vicinity data and/or the vehicle data for the driving situation; and the plurality of predefined driving situation types comprises the first type of driving situations.

5. The device according to claim 1, wherein:

the driving function is configured to longitudinally guide the vehicle in an automated manner at a signaling unit of a traffic junction; and the first location is a location of the signaling unit.

6. The device according to claim 5, wherein:

the driving function at the signaling unit is operable in an automatic mode or in a manual mode;

the driving function is configured to take into account, for the automated longitudinal guidance of the vehicle, the signaling unit automatically in the automatic mode and, in the manual mode, only after confirmation by a user of the vehicle, and the device is further configured to cause the driving function to not be operable in the automatic mode and/or to be operable in the manual mode at the signaling unit located at the first location.

7. The device according to claim 1, wherein a driving situation in which the limitation of the automated longitudinal guidance and/or lateral guidance of the vehicle effected by the driving function has occurred is a driving situation in which:

the automated longitudinal guidance and/or lateral guidance of the vehicle effected by the driving function was changed by a manual intervention by the driver of the vehicle; and/or the driving function was terminated by the driver of the vehicle; and/or a take-over of the longitudinal guidance and/or lateral guidance of the vehicle to the driver of the vehicle was effected.

8. A method for controlling a driving function for automated longitudinal guidance and/or lateral guidance of a vehicle, the method comprising:

ascertaining driving situation data for different driving situations during operation of the driving function in a vehicle, during which a limitation of the automated longitudinal guidance and/or lateral guidance of the vehicle effected by the driving function has occurred;

identifying, based on the driving situation data for the different driving situations, a first type of driving situation and a first location for and at which the limitation of the automated longitudinal guidance and/or lateral guidance of the vehicle effected by the driving function has occurred with a frequency that is equal to or greater than a frequency threshold value;

inserting or updating a map attribute for the first location in map data for a roadway network, wherein the map attribute indicates that the driving function is not operable or is operable only with the reduced degree of automation at the first location, and causing the driving function to not be operated by outputting a takeover request to a driver of the vehicle, or to be operated only with a reduced degree of automation by the driver of the vehicle in a manual mode, during a driving situation of the first type at the first location.

* * * * *